(12) United States Patent
Bristow (10) Patent No.: US 8,318,913 B2
(45) Date of Patent: Nov. 27, 2012

(54) CHITOSAN MANUFACTURING PROCESS

(75) Inventor: Joseph Bristow, Summerville, SC (US)

(73) Assignee: Agratech International, Inc., Goose Creek, SC (US)

( * ) Notice: Subject to any disclaimer, the term of this patent is extended or adjusted under 35 U.S.C. 154(b) by 523 days.

(21) Appl. No.: 12/406,476

(22) Filed: Mar. 18, 2009

(65) Prior Publication Data

US 2009/0275745 A1 Nov. 5, 2009

Related U.S. Application Data

(60) Provisional application No. 61/037,742, filed on Mar. 19, 2008.

(51) Int. Cl.
*C08B 37/08* (2006.01)
*C07H 5/06* (2006.01)

(52) U.S. Cl. ......................................... 536/20; 536/55.1

(58) Field of Classification Search ......................... None
See application file for complete search history.

(56) References Cited

U.S. PATENT DOCUMENTS

| | | | |
|---|---|---|---|
| 3,533,940 A | 10/1970 | Peniston et al. | |
| 3,862,122 A | 1/1975 | Peniston et al. | |
| 4,066,735 A | 1/1978 | Peniston et al. | |
| 4,195,175 A | 3/1980 | Peniston et al. | |
| 4,199,496 A | 4/1980 | Peniston et al. | |
| 4,619,995 A | 10/1986 | Hayes | |
| 5,053,113 A | 10/1991 | Krepets et al. | |
| 5,210,186 A | 5/1993 | Mikalsen et al. | |
| 6,310,188 B1 | 10/2001 | Mukherjee | |
| 6,333,399 B1 * | 12/2001 | Teslenko et al. | 536/20 |
| 6,632,941 B2 | 10/2003 | Wooten et al. | |
| 2002/0055629 A1 | 5/2002 | Mukherjee | |
| 2003/0060610 A1 | 3/2003 | Singer et al. | |
| 2004/0215005 A1 | 10/2004 | Varum et al. | |
| 2006/0205932 A1 | 9/2006 | Cowan et al. | |
| 2007/0112183 A1 | 5/2007 | Kitano et al. | |

FOREIGN PATENT DOCUMENTS

| | | |
|---|---|---|
| CA | 2101079 A1 | 8/1994 |
| CA | 2201212 A1 | 9/1997 |
| CN | 1106999 A | 8/1995 |
| CN | 1158335 A | 9/1997 |
| CN | 1371922 A | 10/2002 |
| CN | 1463988 A | 12/2003 |
| CN | 101177328 A | 5/2008 |
| CN | 101200505 A | 6/2008 |
| JP | 5310804 A | 11/1993 |
| WO | 86/06082 A1 | 10/1986 |
| WO | 91/05808 A1 | 5/1991 |

OTHER PUBLICATIONS

Lertsutthiwong et al., "Effect of Chemical Treatment on the Characteristics of Shrimp Chitosan" Journal of Metals, Materials, and Minerals (2002) vol. 12, No. 1, pp. 11-18.*
International Preliminary Report on Patentability for PCT/US2009/037533, international filing date of Mar. 18, 2009, mailed Jun. 8, 2010, 29 pages.
Mathur, Nawal K., et al., "Chitin and Chitosan, Versatile Polysaccharides from Marine Animals", Journal of Chemical Education, vol. 67, No. 11, Nov. 1990, pp. 938-942.
English Abstract of French Patent Publication No. 2 701 266, published Aug. 12, 1994.
Chandumpai, Ausa, et al., "Preparation and physico-chemical characterization of chitin and chitosan from the pens of the squid species, *Loligo lessoniana* and *Loligo formosana*", Carbohydrate Polymers, Dec. 7, 2004, pp. 467-474, vol. 58, No. 4, Applied Science Publishers, Ltd., Barking, GB.
Guinesi, Luciana Simionatto, et al., "The use of DSC curves to determine the acetylation degree of chitin/chitosan samples", Thermochimica Acta, May 15, 2006, pp. 128-133, vol. 444, No. 2, Elsevier Science Publishers, Amsterdam, NL.
International Search Report for PCT/US2009/037533, international filed of Mar. 18, 2009, mailed Jul. 15, 2009, 7 pages.
Rao, Mukku Shrinivas, et al., "Optimum Parameters for Production of Chitin and Chitosan from Squilla (*S. empusa*)", Journal of Applied Polymer Science, Mar. 15, 2007, pp. 3694-3700, vol. 103, No. 6, Wiley Periodicals, Inc., U.S.
Written Opinion for PCT/US2009/037533, international filed of Mar. 18, 2009, mailed Jul. 15, 2009, 7 pages.
Youn, Dal Kyoung, et al., "Physical characteristics of decolorized chitosan as affected by sun drying during chitosan preparation", Carbohydrate Polymers, May 23, 2007, pp. 707-712, vol. 69, No. 4, Applied Science Publishers, Ltd., Barking, GB.

* cited by examiner

*Primary Examiner* — Eric S Olson
(74) *Attorney, Agent, or Firm* — Cantor Colburn LLP (57) ABSTRACT

A method for producing chitosan from naturally occurring chitin-containing raw material, such as crustacean shells, includes an optional pretreatment step to remove non-chitin rich organic material for example, shrimp flesh, from the raw material, e.g., shrimp shells. The optional pretreatment is followed by a demineralization step utilizing a mild hydrochloric acid solution and a deproteination step utilizing a mild sodium hydroxide solution. The deproteination step is followed by a deacetylation step to remove the acetyl group from N-acetylglucosamine (chitin) to form an amine group, yielding d-glucosamine (chitosan). Each step is followed by a washing step and the product is dried, preferably at a temperature not in excess of about 65° C. Known purification and grinding steps may also be used to produce the final chitosan product. The process is carried out in equipment comprising a series of substantially identical or similar tanks (18, 26, 36, etc.) and dryers (62, 62'), suitably interconnected.

10 Claims, 7 Drawing Sheets

FIG. 1
[LEGEND]

FIG. 2
[LEGEND]

CHITOSAN MANUFACTURING PROCESS

CROSS-REFERENCE TO RELATED APPLICATION

This application claims the benefit of priority of provisional patent application Ser. No. 61/037,742, filed on Mar. 19, 2008, entitled "CHITOSAN MANUFACTURING PROCESS".

BACKGROUND OF THE INVENTION

1. Field of the Invention

The present invention concerns a method for the production of chitosan from naturally occurring chitin-containing materials.

2. Related Art

Chitin $(C_8H_{13}NO_5)n$ is a naturally occurring N-acetylglucosamine polysaccharide that is obtainable from a variety of sources, especially exoskeletons of marine animals; for example, chitin is a principal component of the shells of crustaceans. See the article by Mathur, N. K. and Narang, C. K.; "Chitin and chitosan, versatile polysaccharides from marine animals"; *Journal of Chemical Education*; v. 67, 1990, p. 938, the disclosure of which is incorporated by reference herein.

The following documents are typical of many which disclose various schemes for production of chitosan; Patent Publication US 2006/0205932 A1, Patent Publication CN 1371922A, Patent Publication CN 1158335A, Patent Publication CN 101177328A, and U.S. Pat. No. 4,066,735.

SUMMARY OF THE INVENTION

Generally, the process of the present invention comprises a process to manufacture chitosan comprising the steps of: pretreatment (not needed in all cases), demineralization, deproteination, deacetylation and drying, with water washes after each step except, of course, the drying and dewatering steps. The steps of the process are preferably carried out in the order listed. The starting material may be any naturally occurring source of chitin, such as shells of crustaceans, for example, waste shrimp shells resulting from processing of shrimp. The process of the invention provides a white medical-grade quality chitosan without need for any of the prior art chitosan decolorizing steps.

More specifically, in accordance with the present invention there is provided a process for the manufacture of chitosan from a naturally occurring chitin source, the process comprising the following steps. A naturally occurring chitin source is demineralized by immersing it in a demineralization (sometimes, "DMIN") hydrochloric acid solution, preferably of from about 0.5 to about 2 Molar (M) HCl, more preferably from about 0.9 to about 1.1 M, at a temperature of from about 20° C. to about 30° C., more preferably from about 22° C. to about 26° C., and for a DMIN period, preferably of about 0.5 to about 2 hours, more preferably from about 0.75 to about 1.25 hours, and then separating the resulting demineralized chitin source from the acid solution, washing the chitin source in a DMIN wash water for a DMIN wash period, preferably of about 0.5 to about 2 hours, more preferably from about 0.9 to about 1.1 hours, and then separating the demineralized chitin source from the DMIN wash water. The demineralized chitin source is subjected to deproteination (sometimes, "DPRO") by treating the demineralized chitin source in a DPRO sodium hydroxide solution preferably containing from about 1% to about 10% w/v NaOH, more preferably from about 4% to about 6%, at a temperature preferably from about 60° C. to about 80° C., more preferably from about 70° C. to about 75° C., for a DPRO period, preferably of about 4 to about 24 hours, more preferably from about 4 to about 6 hours, and then separating the resulting DMIN and DPRO chitin source from the deproteination sodium hydroxide solution, washing the separated DMIN and DPRO chitin source in a DPRO wash water, preferably for a DPRO wash period of from about 0.5 to about 2 hours, more preferably for about 1 hour, and then separating the DMIN and DPRO chitin source from the deproteination wash water. Residual water is then separated from the DMIN and DPRO chitin. The chitin source obtained from the deproteination step is immersed into a concentrated sodium hydroxide deacetylation (sometimes, "DEAC") solution preferably containing from about 40% to about 50% w/w NaOH, more preferably from about 45% to about 50% w/w, at a temperature of from about 90° C. to about 1110° C. for a DEAC period of time sufficient to convert acetyl groups of the chitin source obtained from the deproteination step to amine groups, to thereby form a chitosan biopolymer having d-glucosamine as the monomer of the chitin biopolymer. The resulting chitosan biopolymer is separated from the DEAC solution and the separated chitosan biopolymer is washed in a DEAC wash water, preferably for a DEAC wash period of from about 1 to about 3 hours, more preferably from about 0.9 to about 1.1 hours, and then separating the chitosan biopolymer from the DEAC wash water. Residual water is then separated from the chitosan biopolymer which is then dried in air, preferably at a temperature of about 50° C. to about 65° C., more preferably, from about 50° C. to about 60° C., for a time period preferably from about 4 to about 6 hours, more preferably from about 2 to about 5 hours, to reduce the moisture content of the chitosan biopolymer to below 10% to provide a medical-grade quality chitosan.

In another aspect of the present invention there is provided in the above process an optional, initial pretreatment (sometimes, "PTRT") step in order to remove non-chitin rich organic material from the naturally occurring chitin source by treating the chitin source with a mild pretreatment sodium hydroxide solution, preferably containing from about 1% to about 4% w/v NaOH for about 2 to about 24 hours at a temperature, preferably of from about 20° C. to about 30° C., to remove non-chitin organic material. The resulting pretreated chitin source is separated from the pretreatment sodium hydroxide solution, and then the pretreated chitin source is washed for a PTRT wash period of, preferably from about 0.5 to about 2 hours.

Other aspects of the present invention provide one or more of the following steps alone or in any suitable combination. The naturally occurring chitin source may comprise exoskeletons of a marine animal; the naturally occurring chitin source may comprise crustacean shells; the naturally occurring chitin source may comprise shrimp shells; the demineralization step may be carried out before the deproteination step; the chitosan polymer obtained from the deacetylation step is in flake form and is thereafter ground into powder form; one or more additional steps of the process may be provided, the additional steps consisting essentially of removing foreign particles, arsenic, mercury, lead and other heavy metals, and microbiological contaminants from the chitin source at any step of its treatment and any of the materials resulting from treatment of the chitin source; any additional process steps directed at whitening the chitosan product other than those defined in any or all of the process steps above, may be excluded.

DETAILED DESCRIPTION OF THE INVENTION AND SPECIFIC EMBODIMENTS THEREOF

Figure 3:
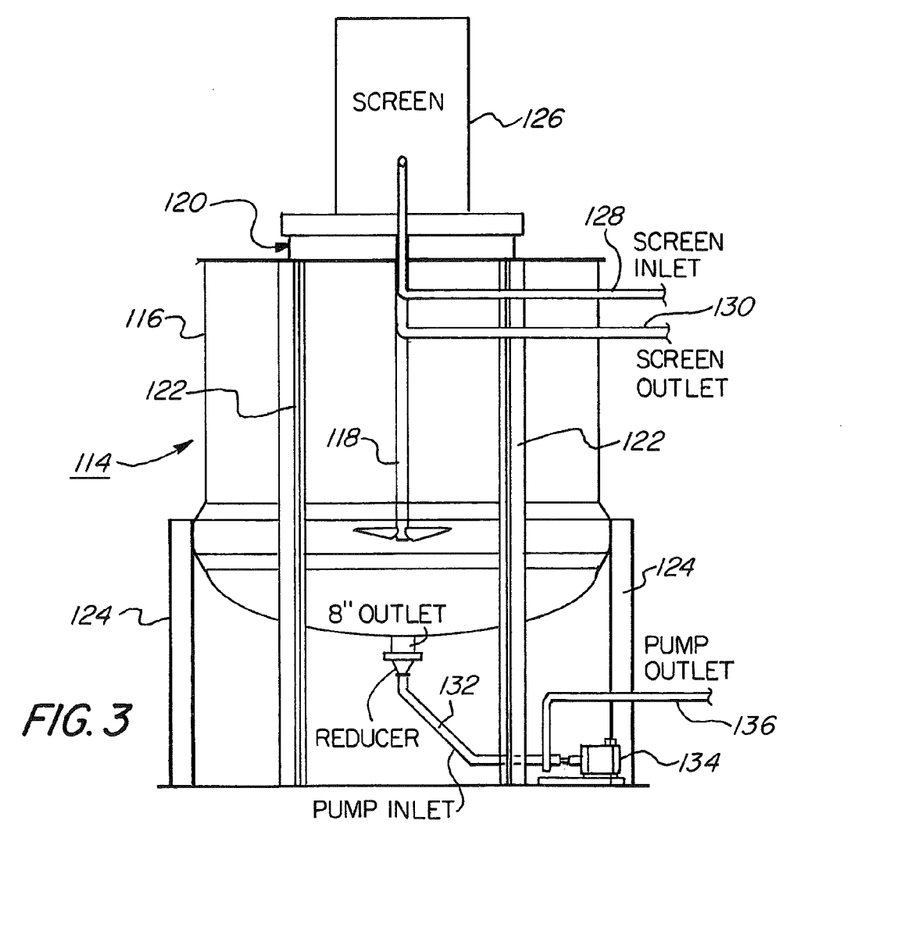
FIG. 3 is a schematic, cross-sectional elevation view of a typical process tank used in the manufacturing lines of FIGS. 1 and 2.
Figure 3A:
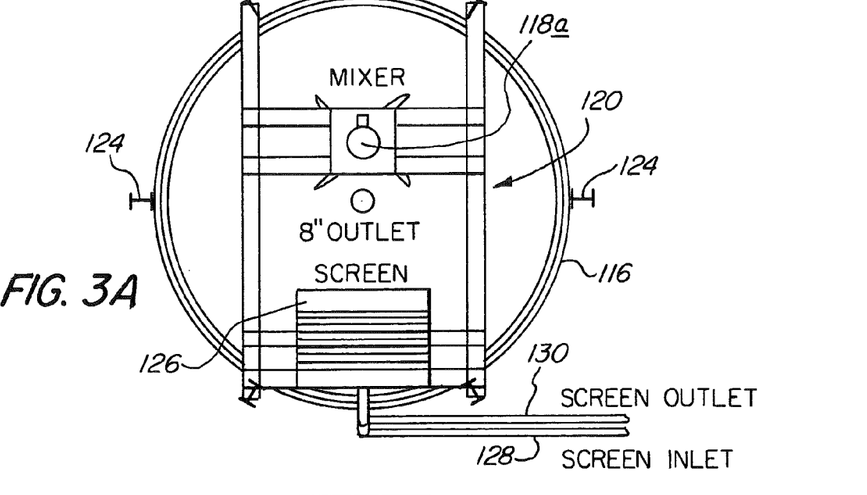
FIG. 3A is a schematic plan view of the process tank of FIG. 3.
Figure 3B:
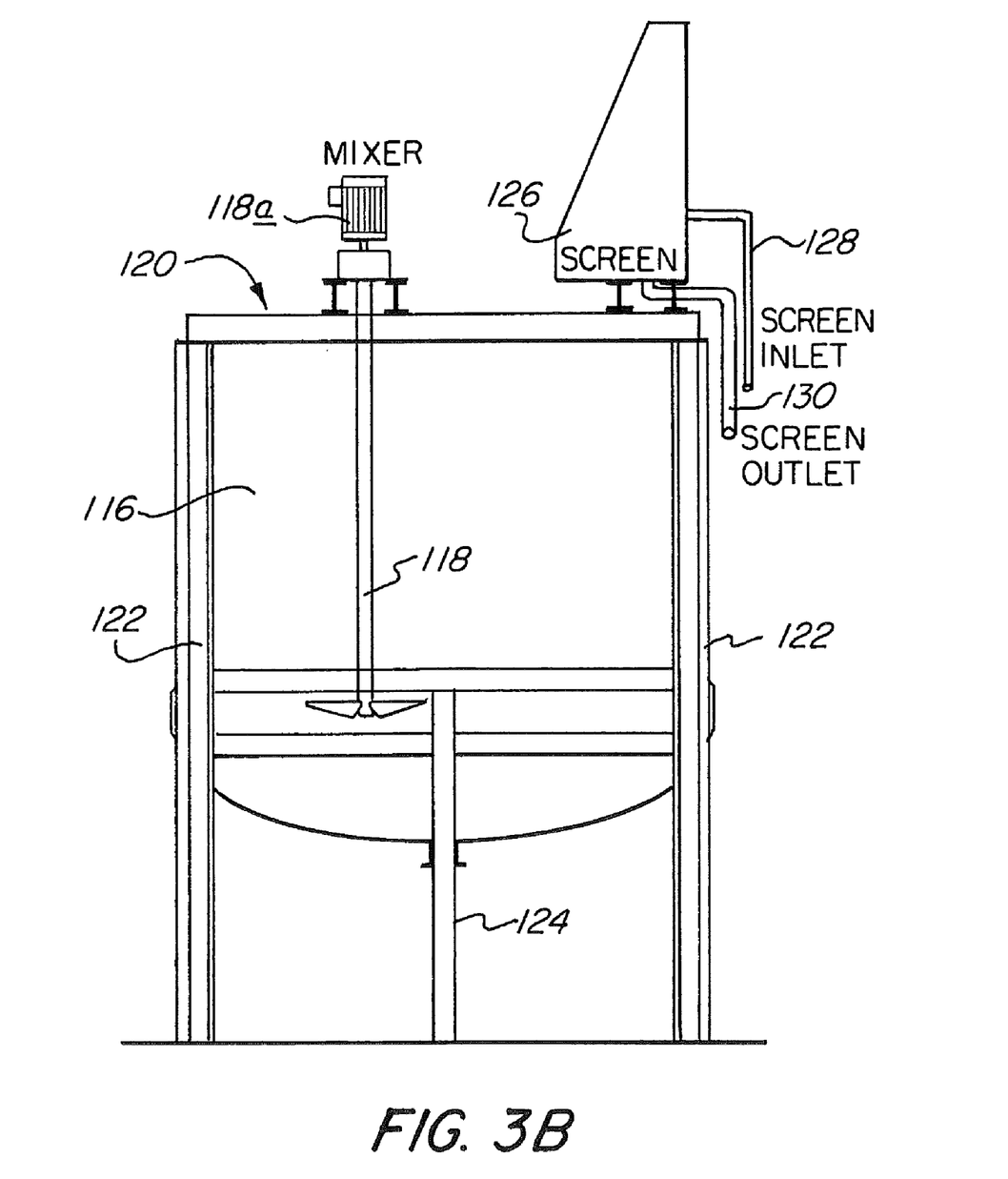
FIG. 3B is a schematic, cross-sectional elevation view of the process tank of FIG. 3 rotated ninety degrees to counter-clockwise from its position in FIG. 3A of the drawings.

All steps of the process of the present invention may conveniently be performed in a series of substantially uniform cylindrical tank/screen/mixer arrangements of the type shown in FIGS. 3, 3A and 3B of the drawings. Substantial uniformity of the several reactor vessels required provides economies in initial capital investment and in maintenance and repair. Numerous pumps are shown in the drawings but are not numbered or specifically noted, as their function will be clear to those skilled in the art from the location of the pumps and the description of the process. The water used for all post-treatment washes described below is at the temperature at which unheated water is supplied to the facility in which the process is being carried out.

Pretreatment Step

The pretreatment step is optional in the sense that it is needed only if the chitin source contains a significant amount of non-chitin rich organic material. (The term "non-chitin rich organic material" includes material containing no chitin.) In such cases, the pretreatment step is used to remove non-chitin rich organic material from the organic source of chitin, for example, to remove residual shrimp flesh from shrimp shells. The following description refers to shrimp shells as the naturally occurring source of chitin although it will be appreciated that other marine life exoskeletons, that is, shells, especially shells of crustaceans are major sources of natural chitin and are suitable for use in the process of the present invention. There are other natural sources of chitin such as certain fungi, algae, yeast, insects, and some plants.

The removal of non-chitin rich organic material from shrimp shell waste is accomplished by utilizing a mild sodium hydroxide pretreatment solution, for example, 1% w/v NaOH. This step is needed when there is present a quantity of non-chitin rich organic material, e.g., shrimp flesh present in shrimp shells disposed of by shrimp processors. A small amount of proteins may also be removed from the surface of the shrimp shells in the pre-treatment step, aiding in the removal of proteins in a later deproteination step.

Figure 1:
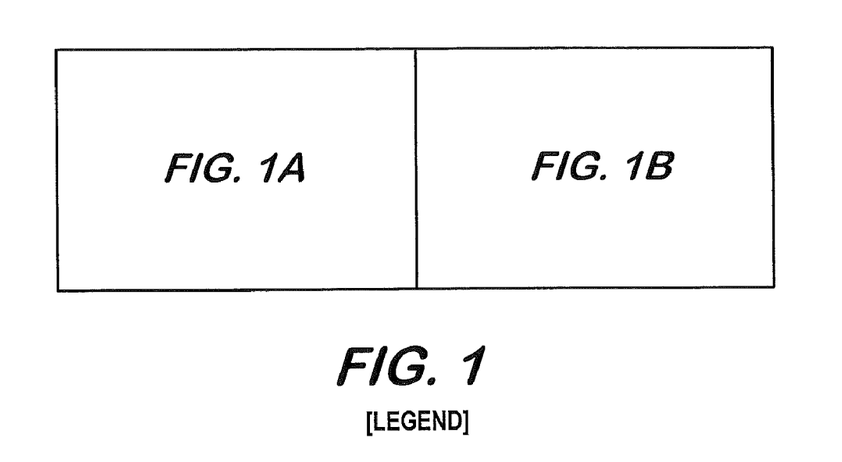
FIG. 1 is a legend showing that FIG. 1B is a continuation of FIG. 1A.
Figure 1A:
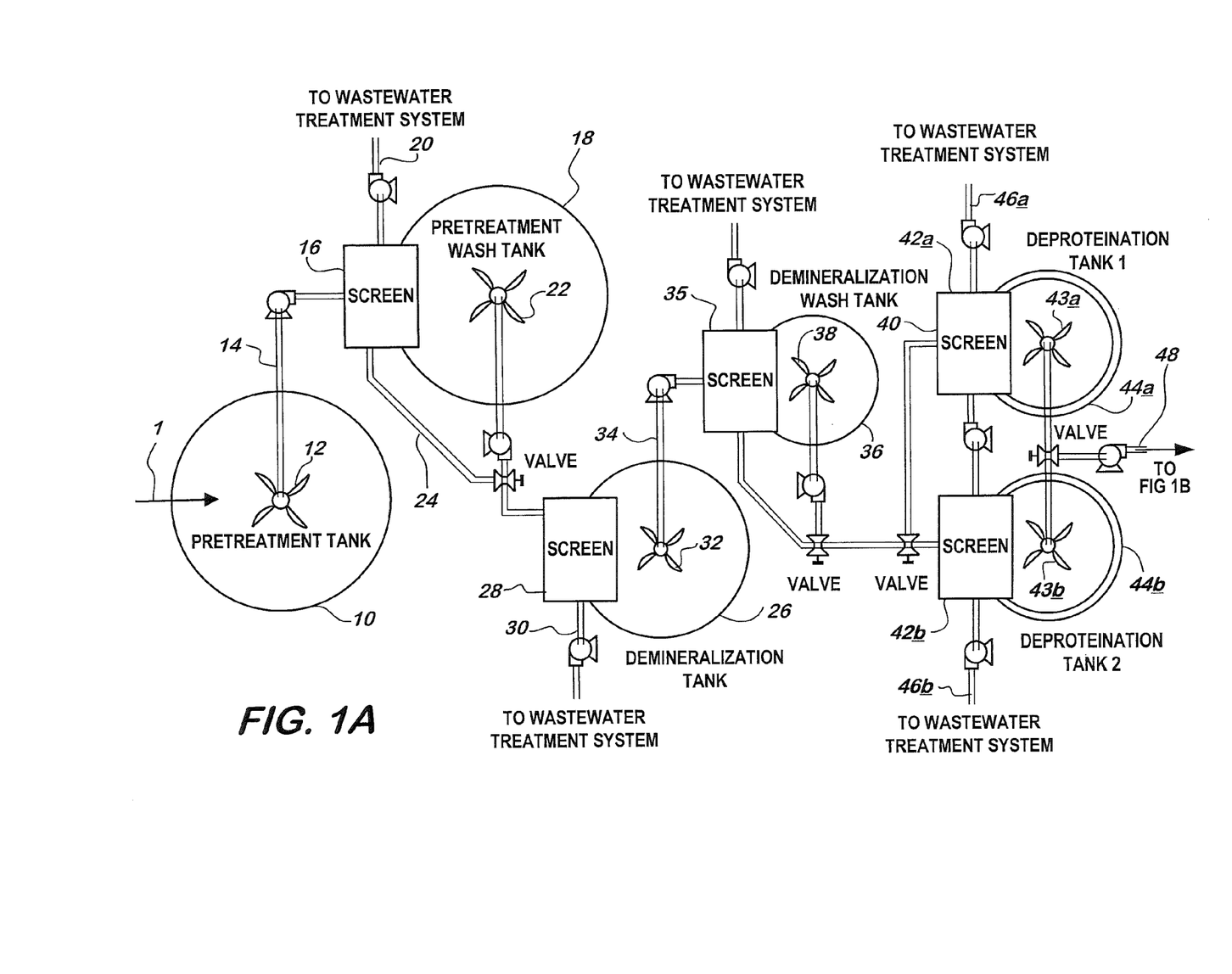
FIG. 1A is a schematic plan view of the first part of a manufacturing line for the extraction of chitin from shrimp shells in accordance with an embodiment of the present invention.

As shown in FIG. 1A, the shells are introduced as indicated by arrow 1 into pretreatment tank 10, in which the shells are immersed in a mild sodium hydroxide (NaOH) solution for two hours at room temperature, with agitation provided by a motorized mixer 12. The liquid-to-solids ratio in tank 10 may be six liters of the sodium hydroxide solution per kilogram of shrimp shell (6 L/kg, equivalent to 0.72 gal/lbm). In laboratory experiments, both bench-scale and large-scale, the shrimp shells were typically allowed to soak overnight in the mild sodium hydroxide solution without agitation. Observation suggested that the shells were "clean" within two hours, and that the presence of agitation aids the process of removing the non-chitin rich organic material, that is, the shrimp flesh. Accordingly, the pretreatment process time with mechanical agitation for shrimp shells may safely be about two hours at room temperature.

After the pretreatment process is complete, the pretreated shrimp shells are transferred to the pretreatment wash step by pumping the shrimp shells via line 14 to a static screen 16 located above pretreatment wash tank 18. The spent sodium hydroxide liquid is separated from the shrimp shells by static screen 16 and pumped to a wastewater treatment system (not shown) via line 20. The shrimp shells fall into water in the pretreatment wash tank and are mechanically agitated by a motorized mixer 22. The liquid-to-solids ratio in the pretreatment wash tank 18 is about six liters per kilogram of treated shrimp shell (6 L/kg or 0.72 gal/lbm). Once the shrimp shells have been added to the wash tank 18, the liquid is circulated through the static screen, where the pretreatment wash water is removed and sent to a wastewater treatment system (not shown), while the shrimp shells fall back into the wash tank 18. Simultaneously, fresh water is added to the wash tank 18 by means not shown, to maintain the liquid-to-solids ratio. This process is performed for about one hour, after which time the water/shrimp shell mixture is sent to the demineralization tank 26, as described below.

Demineralization

Shrimp shells contain essentially three components: minerals, proteins and chitin. The demineralization step removes the minerals in the shrimp shells using a mild hydrochloric acid solution, for example, 1 M HCl.

The pretreated shrimp shells are pumped via line 24 from the pretreatment wash tank 18 to a static screen 28 where the liquid is separated from the clean shells and pumped via line 30 to a wastewater treatment system (not shown). The shrimp shells fall from screen 28 into the demineralization tank 26 in which water at ambient temperature is being agitated by motorized mixer 32. After all the shrimp shells have been added to the tank 26, an amount of concentrated HCl (22° Bé) needed to create a 1 M HCl demineralization solution in the tank 26 is metered into the liquid over a period of twenty minutes. Metering the concentrated HCl into the process prevents excessive foaming caused by the release of carbon dioxide from the reaction between the acid and the minerals, the latter primarily comprising calcium carbonate. The solution is mixed for about one hour at room temperature, including the time that the HCl is metered into the liquid. The liquid-to-solids ratio in demineralization tank 26 is about four liters per kilogram of clean shell (4 L/kg or 0.48 gal/lbm). At the end of the treatment time, the demineralized shrimp shells are pumped via line 34 to static screen 35 mounted atop demineralization wash tank 36. The demineralization liquid is separated in static screen 35 from the demineralized shrimp shells and the liquid is pumped via line 37 to a wastewater treatment system (not shown). The shrimp shells are deposited into demineralization wash tank 36.

The demineralization wash step in wash tank 36 is performed in the same manner as the pretreatment wash step, with the liquid-to-solids ratio set at four liters per kilogram of demineralized shell (4 L/kg or 0.48 gal/lbm). Once the shells have been washed for one hour with agitation by motorized mixer 38, the water/demineralized shell mixture is pumped to the deproteination step as described below.

Deproteination

The deproteination step removes the proteins from the shrimp shells using a mild sodium hydroxide solution, for example, about 5% w/v NaOH. Once the deproteination step is complete, the remaining component is the biopolymer chitin.

The demineralized shrimp shells are pumped via line 40 from the demineralization wash tank 36 to static screens 42a, 42b located atop, respectively, deproteination tanks 44a, 44b. The demineralization liquid is separated from the demineralized shells in screens 42a, 42b and pumped via lines 46a, 46b to a wastewater treatment system (not shown). The demineralized shells fall into the deproteination tanks 44a, 44b in which a 5% w/v NaOH deproteination solution heated to about 70° C. is being agitated by motorized mixers 43a, 43b. In the design of the process line and the determination of the process timetable, it is advantageous to have two process tanks for the deproteination step instead of one, as is the case in the other steps. The use of two deproteination tanks allowed six batches of shrimp shells to be processed in a single day by a single line, thereby increasing the throughput of one production line and reducing the number of production lines needed, thereby resulting in lower capital costs. The solutions are mixed for six hours in deproteination tanks 44a, 44b with the temperature being maintained at about 70° C. The liquid-to-solids ratio in deproteination tanks 44a, 44b is about four liters per kilogram of demineralized shell (4 L/kg or 0.48 gal/lbm). Deproteination steps performed in the laboratory ranged in time from four to nineteen hours (overnight operation). Process times longer than four hours did not make a noticeable difference in the quality of the chitosan product of the process, but the process timing scheme benefited from a six-hour treatment time in the deproteination step.

Figure 1B:
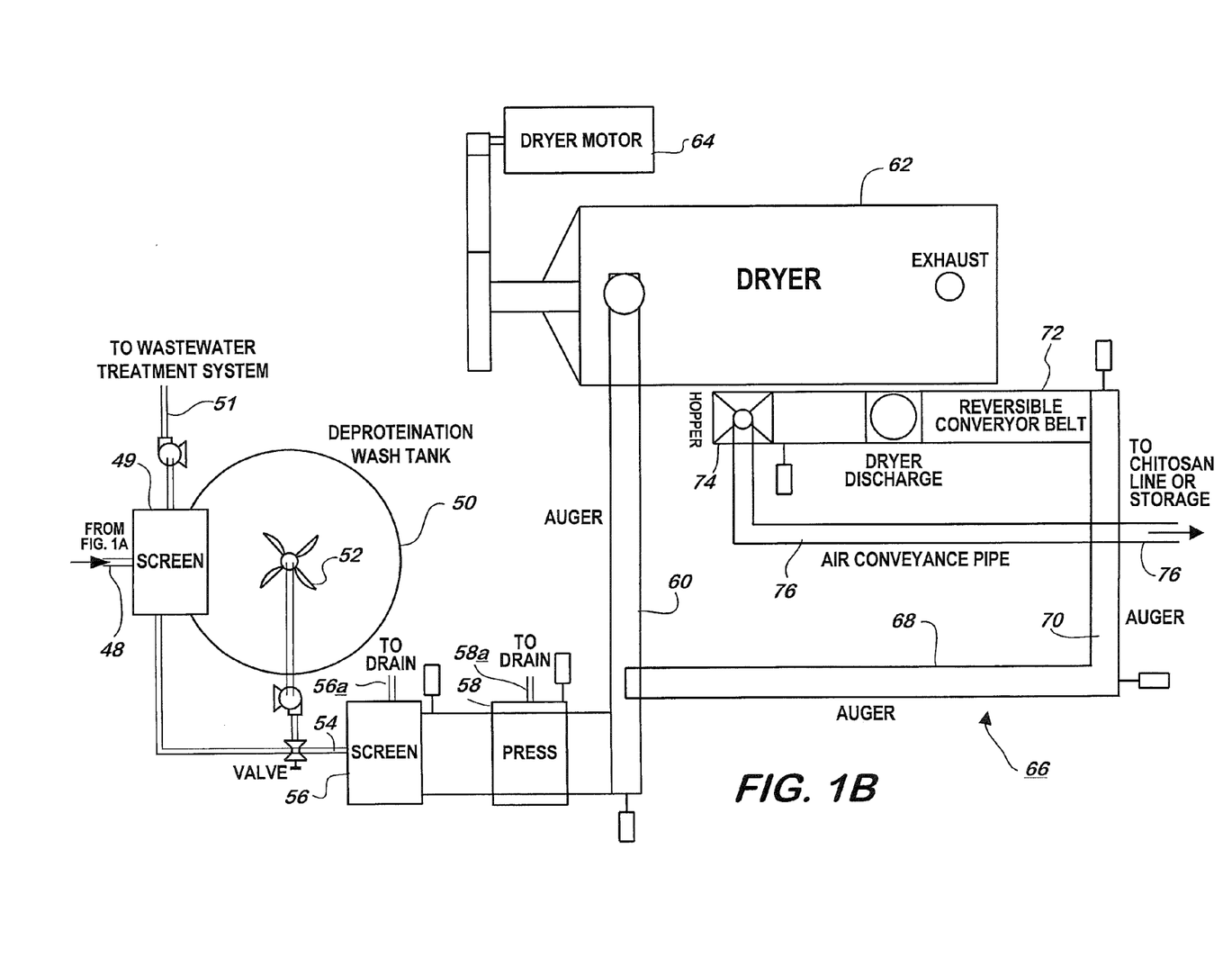
FIG. 1B is a schematic plan view of the second part of the manufacturing line, the first part of which is shown in FIG. 1B.

After the deproteination step treatment time ends, the resulting chitin is pumped from the deproteination tanks 44a, 44b via line 48 (FIG. 1A) to static screen 49 (FIG. 1B) in which liquid is separated from the chitin. As shown in FIG. 1B, the liquid is sent via line 51 to a wastewater treatment system (not shown) and the chitin is deposited into the deproteination wash tank 50 which is supplied with wash water by means not shown. The wash step is performed in the same manner as previous wash steps at ambient temperature with agitation by motorized mixer 52 and a liquid-to-solids ratio of about four liters per kilogram of chitin (4 L/kg or 0.48 gal/lbm). Once the chitin has been washed for one hour, the water/chitin mixture is pumped via line 54 to a static screen 56 set atop a simple belt press 58. The deproteination wash water is separated from the chitin and discharged to drains via lines 56a and 58a from, respectively, screen 56 and belt press 58. The chitin falls on the belt press 58, which presses excess water from the chitin. The chitin is then transferred by screw auger 60 (or by a conveyor belt or any other suitable means) to a rotating dryer 62 which is rotated by dryer motor 64. The drying temperature is the same as that described in paragraph [0030] below, in connection with drying the chitosan product. The dryer 62 incorporates a return system 66 comprised of augers 68, 70 (or screw conveyers or the like) and a reversible conveyer belt 72. Return system 66 may be operated to reintroduce partially dried chitin back into the dryer 62 one or more times in order to get as dry a material as is feasible. Adequate drying is important for chitin because the more moisture that is contained in the chitin, the greater the reduction in the concentration of the sodium hydroxide solution in the deacetylation step, described below in connection with FIG. 2. Reducing the sodium hydroxide concentration in the deacetylation step concomitantly reduces the effectiveness of the deacetylation process.

A hopper 74 is fed by dryer 62 to discharge dried chitin from dryer 62, the dried chitin being conveyed by an air conveyance pipe 76 (or any other suitable means) to a storage tank (not shown) or directly to the chitosan production line illustrated in FIG. 2 and described below, or to other processing.

The Mathur/Narang article noted above suggests that the order of the demineralization and deproteination steps can be interchanged depending on the shells being processed. Laboratory experiments were conducted with shrimp shells, with the deproteination preceding the demineralization and vice versa. It was determined that better results come from performing the demineralization before the deproteination step. Without wishing to be bound thereby, it is believed that the reason for the better results obtained by performing demineralization before deproteination may lie in the size of the molecules targeted in the two steps. The minerals are much smaller molecules and more numerous than the proteins; therefore, the hydrolysis of the proteins may be more easily achieved when the minerals are not present. That also applies to shells of other marine animals, including crustaceans.

Deacetylation

Figure 2:
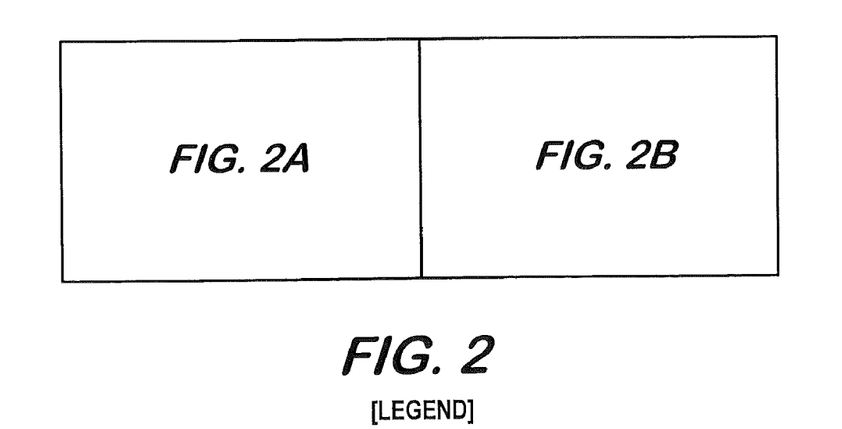
FIG. 2 is a legend showing that FIG. 2B is a continuation of FIG. 2A.
Figure 2A:
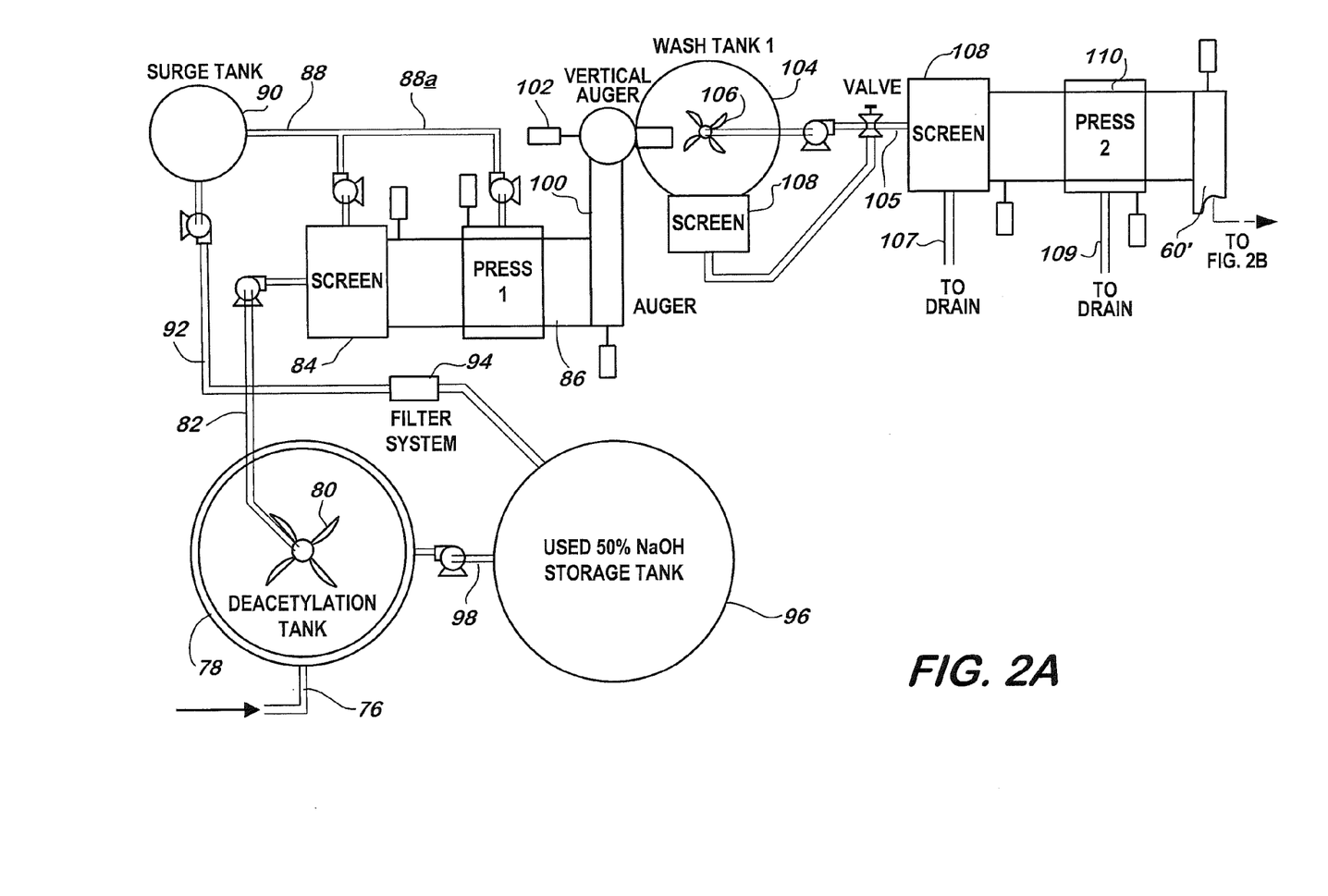
FIG. 2A is a schematic plan view of a manufacturing line for the conversion of chitin to chitosan in accordance with an embodiment of the present invention.
Figure 2B:
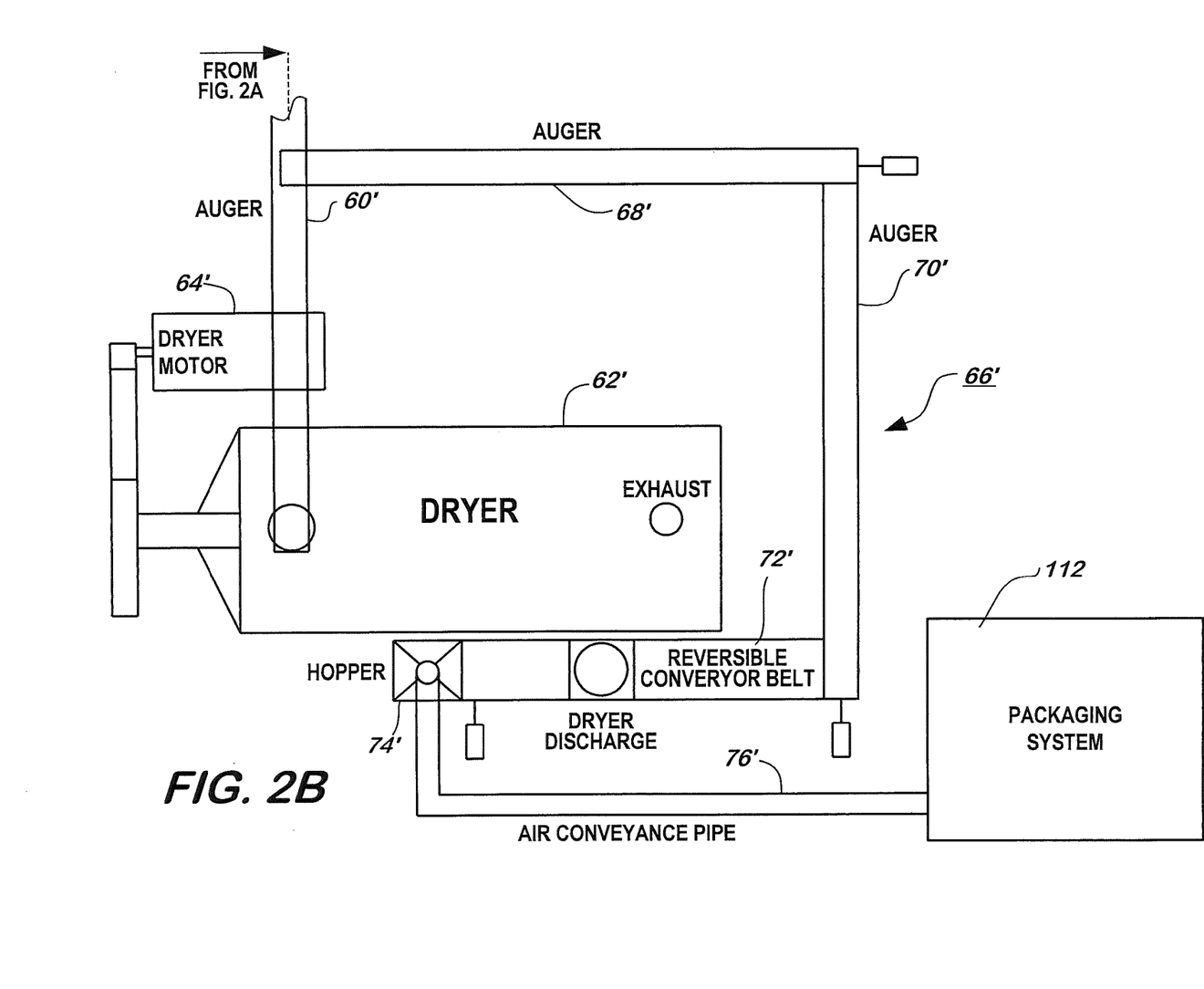
FIG. 2B is a schematic plan view of the second part of the manufacturing line, the first part of which is shown in FIG. 2A.

FIGS. 2A and 2B illustrate a production line for manufacturing chitosan from the chitin produced by the production line illustrated in FIGS. 1A and 1B. As shown in FIG. 2A, a deacetylation step is employed to remove the acetyl group from N-acetylglucosamine (the chitin monomer) creating an amine group, which results in d-glucosamine as the chitosan monomer, thus forming the biopolymer chitosan. The number of chitin monomers converted, or the degree of deacetylation (expressed as a percentage), is a measure of the effectiveness of the deacetylation step. A high degree of deacetylation is of course desirable.

Dry chitin obtained by the process described with reference to FIGS. 1A and 1B is added via pipe 76 (FIG. 2A) to a concentrated sodium hydroxide deacetylation solution of about 50% w/w NaOH at a temperature of about 100° C. in deacetylation tank 78, with agitation by motorized mixer 80. The chitin feed to deacetylation tank 78 has been dried to the extent feasible by removing as much residual water from it, in order to reduce the amount of water, and therefore reduce the amount of dilution of the concentrated sodium hydroxide in deacetylation tank 78. Removal of residual water may be carried out by any suitable means, for example, pressing, heating at a maximum temperature of 65° C., or a combination of pressing and heating. The liquid-to-solids ratio in deacetylation tank 78 is about fifty liters per kilogram of chitin (50 L/kg or 5.99 gal/lbm). This step is performed for about three hours. Once the treatment time ends, the chitosan/sodium hydroxide deacetylation solution is pumped via line 82 to a static screen 84 set atop a simple belt press 86. The sodium hydroxide deacetylation solution is separated from the chitosan in static screen 84 and pumped via line 88 into a surge tank 90, while the chitosan falls onto the belt press 86, which presses out excess sodium hydroxide solution, which is also sent via lines 88a and 88 to the surge tank 90. Liquid in surge tank 90 is pumped via line 92 and filter system 94 to used sodium hydroxide storage tank 96. The sodium hydroxide in tank 96 is re-used by being pumped through line 98 to deacetylation tank 78.

The chitosan is then transferred from belt press 86 via horizontal auger 100 and vertical auger 102 to the deacetylation wash tank 104. Deacetylation wash tank 104 performs in a manner similar to the wash tanks of the previous steps. Once the chitosan has been washed in deacetylation wash water for about one hour at ambient temperature with agitation by motorized mixer 106, it is pumped through line 105 to a screen 108 set atop a simple belt press 110. The water is separated from the chitosan, and the separated water is sent via line 107 to a drain. The chitosan falls on the belt press 110, which presses water from the chitosan and this used deacetylation wash water is sent to a drain via line 109. The chitosan is then transferred via an auger 60' (FIGS. 2A and 2B) to a dryer 62' (FIG. 2B).

As shown in FIG. 2B, auger 60' is part of a return system 66' which is substantially the same as return system 66 of FIG. 1B and operates in the same manner as return system 66, that is, return system 66' is capable of returning chitosan removed from dryer 62' back to dryer 62' in order to subject the chitosan to repeated drying cycles. Adequate drying is important inasmuch as a low moisture content in the chitosan is desirable for the final product, so the drying should be as complete as possible. The drying temperature for the chitosan should not, however, exceed about 65° C., as higher temperatures cause the chitosan to turn from white to pale yellow. The return system 66' helps the chitosan drying process by providing two or more passes through the low-temperature dryer, which, for example, may be operated at a temperature of from about 37° C. to about 60° C. to 65° C. The upper limit on temperature may be somewhat below 65° C. to insure that there is no yellowing of the chitosan, especially if temperature variations may occur. Therefore, the upper limit may be held to, for example, about 60° C., 61° C., 62° C., 63° C. or 64° C., or even lower.

The components of return system 66' are numbered identically to those of return system 66 except for the addition of a prime indicator thereto and as they function identically to the components of return system 66 is it not necessary to provide a detailed description of system 66' and its operation. Air conveyance pipe 76' transfers the dried chitosan from return system 66' to a packaging system 112 wherein the chitosan, which is in flake form, is appropriately packaged for shipment. Obviously, instead of being packaged, some or all of the chitosan may be conveyed by pipe 76' directly to another production line for use or for further treatment. Equally obviously, other treatment equipment (not shown) may be introduced into the production line of FIGS. 1A and 1B and/or FIGS. 2A and 2B at appropriate locations for other treatment by known methods for purification, grinding, etc., of the chitosan as described below.

Referring now to FIGS. 3, 3A and 3B, there is shown a process tank 114 which is typical of the screen-equipped tanks of FIGS. 1 and 2. Process tank 114 comprises a tank body 116 having mounted thereon a motorized mixer 118 which is driven by a motor 118a (FIGS. 3A and 3B). Motorized mixer 118 is supported atop tank body 116 by a cradle 120. Tank body 116 is supported by a plurality of stanchions 122, 124. A screen 126 is also carried by cradle 120 and has a screen inlet line 128 and a screen outlet line 130 connected thereto for introducing process material into screen 126 via inlet line 128 and withdrawing liquid therefrom via outlet line 130.

Tank body 116 may of course be made of any suitable material such as steel or fiberglass. For process tanks which are operated at elevated temperatures, a tank construction substantially similar to that illustrated in FIGS. 3, 3A and 3B is utilized, except that the tank has a steam jacket disposed around the exterior thereof and is equipped with a hinged lid to retain heat within the tank, the lid permitting access to the tank interior. Contents of tank 114 may be withdrawn via a tank outlet line 132, a pump 134 and a pump outlet line 136.

In general, treatment of the waste streams from the chitosan manufacturing process is undertaken in the same manner as for any similar aqueous waste streams, focusing on those contaminants that exceed local discharge requirements. In order to more efficiently treat the wastewater, the waste streams from the pretreatment, pretreatment wash, deproteination, deproteination wash and the deacetylation wash are mixed together to create a single stream which will have a pH around 13 (basic waste). The waste streams from the demineralization and demineralization wash are combined, creating an acidic waste which is then added to the basic waste. As the acidic waste is added to the basic waste, calcium hydroxide ($Ca(OH)_2$) precipitates out of solution, resulting in a reduction in the overall pH of the wastewater to approximately 10 and clarifying the wastewater by an entrapment of suspended materials by the precipitating calcium hydroxide. Removal of the calcium hydroxide precipitate leaves a translucent, pale yellow wastewater that is then neutralized and treated to meet discharge requirements.

EXAMPLE 1

Chitosan material derived from shrimp shells in accordance with the above-described process was characterized to determine the material's characteristics of degree of deacetylation ("DDA" in Table I below), molecular weight, moisture content, and residual protein and ash content. Degree of deacetylation ("DDA") was determined based on acid-base titration using methyl orange as pH indicator (Broussignac P. Chim. Ind. Genie. Chim. 1968, 99:1241; Domszy J G, Roberts G A F. Makromol. Chem. 1985, 186:1671). Molecular weight of the material was determined based on viscometry (Wang W, Bo S, Li S, Qin W. Int J Biol Macromol, 13:281-285, 1991) and by gel permeation chromatography (GPC) using dextran as standard (Ratajska M, Wisniewska-Wrona M, Strobin G, Struszczyk H, Boryniec S, Ciechanska D. Fibers & Textiles in Eastern Europe, 11:59-63, 2003). Moisture content was determined according to ASTM F2103-01 Standard Guide for Characterization and Testing of Chitosan Salts as Starting Materials Intended for Use in Biomedical and Tissue-Engineering Medical Product Applications. Residual protein content was determined via the bicinchoninic acid ("BCA") assay utilizing a BCA Protein Assay Kit manufactured by Pierce Biotechnology of Rockford, Ill. Residual ash content was determined via combustion at 550° C. as described in an article by Tingda Jiang, CHITOSAN, Chemical industry press, Beijing, China. 2001, p 108.

Results

The results of the analyses of a chitosan product produced by the above described method and designated "Sample A" are presented in tables below (Table II contains the results of the GPC molecular weight analysis). Sample A was produced by a "large-scale" chitosan manufacturing run performed with 44 kilograms of shrimp shell. Sample A was pretreated overnight, demineralized for 1.25 hours in a 0.909 M HCl solution, washed, deproteinated overnight at an average temperature of 72° C., washed, deacetylated for 3 hours in 50% NaOH solution at an average temperature of 111° C., washed and dried at 65° C. The resulting chitosan was white flakes. Sample A was not purified or ground into a powder. Values are expressed as mean±standard deviation of number (n) of samples measured as indicated. It is noted that residual protein content was below the detection limit of the above-mentioned BCA assay.

TABLE I

| Sample | DDA (%)[1] | $M_v$[2] (Daltons*10^6) | Residual Protein (values are below detection limit) | Moisture (%) | Residual Ash (%) |
|---|---|---|---|---|---|
| Sample A | 82.85 ± 0.40 (n = 3) | 1.40 | <0.19% or <1.94 mg/g Chitosan | 9.14 ± 0.22 (n = 3) | 0.097 ± 0.003 (n = 3) |

[1]Degree of deacetylation is the percentage obtained by dividing the number of acetyl groups removed by the number of acetyl groups originally present, and multiplying by one hundred.
[2]Molecular weight (viscosity-average) value.

TABLE II

| Sample | $M_W$[3] | $M_N$[4] | $M_V$ | Polydispersity Index[5] |
|---|---|---|---|---|
| Sample A | 104620.29 | 662.21 | 103592.16 | 157.99 |

[3]Molecular weight (weight-average) value.
[4]Molecular weight (number average) value.
[5]The ratio of weight-average molecular weight to number average molecular weight.

The chitosan characteristics achieved with the above process are summarized below. The above-described process was intended to be capable of manufacturing a chitosan that would qualify as medical-grade quality. While there seems to be no set standard regarding the characteristics of medical-grade quality chitosan, information obtained from the internet regarding pharmaceutical grade chitosan suggests that the material characteristics shown in Table III under the heading "Value", are typical for medical-grade quality chitosan. As Table II shows, the reported values for the chitosan of Sample A exceeds the requirements for medical-grade quality chitosan.

TABLE III

| Characteristic | Value | Reported Value for Chitosan Sample A |
|---|---|---|
| Degree of Deacetylation | 80% or greater | 82.85 ± 0.40% |
| Protein Content | less than 0.3% | less than 0.19% |
| Ash Content | less than 0.2% | 0.097 ± 0.003% |
| Moisture Content | less than 10% | 9.14 ± 0.22% |

The above characteristics of the chitosan produced by the above-described process serve as an excellent starting point for all grades of chitosan, up to and including medical-grade. In addition to the process steps described above, purification steps to remove foreign particles, heavy metals, arsenic, mercury, lead and microbiological contaminants may be carried out by methods known to the art. A grinding step to produce a chitosan powder, which appears to be a common form of higher grades of chitosan, may also be carried out.

Utilizing the tank/screen/mixer arrangement for all the steps in the process allows the overall process to be scaled to handle practically any amount of shrimp shells, or other chitosan-containing raw material, per day. The designer has the option of increasing the size of the tanks, or utilizing multiple lines to achieve the desired shrimp shell or other chitosan-containing raw material processing rate. The percent loss of material in each step has been experimentally measured, so by knowing the amount of shrimp shell to be processed in a single batch, the designer can specify the water and chemical requirements as well as the tank sizes for each step. These values can be programmed into the process control system along with the processing conditions and timings so that the chitosan produced is consistent from batch to batch.

The above-described basic four-step process produces a consistent high quality chitosan of at least industrial grade which may serve as the precursor to the processing of higher grades of chitosan with the addition of known purification and grinding steps. The process is easily scalable knowing the amount of shrimp shell or other chitosan-containing raw material to be processed, allowing the process to be tailored to any situation where shrimp shell waste or other chitosan-containing raw material is available.

What is claimed is:

1. A process for the manufacture of chitosan from a naturally occurring chitin source comprises the following steps:
    (i) an initial pretreatment ("PTRT") step carried out prior to step (a) below in order to remove non-chitin rich organic material from the naturally occurring chitin source by treating the chitin source with a mild PTRT sodium hydroxide solution for a PTRT time period and under conditions of time and temperature, to remove non-chitin organic material from the chitin source, and then separating the resulting pretreated chitin source from the PTRT sodium hydroxide solution, and washing the pretreated chitin source for a PTRT wash period sufficient to remove therefrom sodium hydroxide;
    (a) the naturally occurring chitin source is obtained from initial step (i) demineralized by immersing it in a demineralization ("DMIN") hydrochloric acid solution of from about 0.5 to about 2 M at a temperature of from about 20° C. to about 30° C. and for a DMIN time period of from about 0.5 to about 2 hours to demineralize the chitin source, and then separating the resulting demineralized chitin source from the acid solution, washing the chitin source in a DMIN wash water for a DMIN wash period of from about 0.5 to about 2 hours to remove the hydrochloric acid and calcium salts therefrom, and then separating the demineralized chitin source from the DMIN wash water;
    (b) subjecting the demineralized chitin source to deproteination ("DPRO") by treating the demineralized chitin source in a DPRO sodium hydroxide solution containing from about 1% to about 10% w/w NaOH for a DPRO time period of from about 4 to about 24 hours and at a temperature of from about 60° C. to about 80° C. to deproteinize the demineralized chitin source, and then separating the resulting demineralized and deproteinized chitin source from the deproteination sodium hydroxide solution, washing the separated demineralized and deproteinized chitin source in a DPRO wash water for a DPRO wash period of from about 0.5 to about 2 hours to remove the sodium hydroxide from the demineralized and deproteinized chitin source, and then separating the demineralized and deproteinized chitin source from the deproteination wash water;
    (c) separating residual water from the chitin source obtained in step (b);

(d) immersing the chitin source obtained from step (b) into a sodium hydroxide deacetylation ("DEAC") solution containing from about 40% to about 50% w/w NaOH and carrying out deacetylation at a temperature of from about 90° C. to about 110° C. and for a DEAC time period of from about 1 to about 3 hours to convert acetyl groups of the chitin source obtained from step (c) to amine groups, to thereby form a chitosan biopolymer having d-glucosamine as the monomer of the chitin biopolymer, then separating the resulting chitosan biopolymer from the DEAC solution and washing the separated chitosan biopolymer in a DEAC wash water for a DEAC wash period sufficient to remove sodium hydroxide from the chitosan polymer, and then separating the chitosan biopolymer from the DEAC wash water; and (e) residual water is then separated from the chitosan biopolymer which is then dried in air at a temperature of not more than about 65° C. for a drying time period sufficient to reduce the moisture content of the chitosan biopolymer to below about 10% by weight to provide a medical-grade quality chitosan.

2. The process of claim 1 wherein the PTRT sodium hydroxide solution comprises a mild pretreatment sodium hydroxide solution containing from about 1% to about 4% w/v NaOH, the PTRT time period is from about 2 to about 24 hours and the temperature is from about 20° C. to about 30° C., and the PTRT wash period is from about 0.5 to about 2 hours.

3. The process of claim 1 wherein step (e) is carried out under conditions comprising that the temperature is from about 50° C. to about 60° C. and the drying period is from about 2 to about 3 hours.

4. The process of any one of claim 1, 2, or 3 wherein the chitin source comprises exoskeletons of a marine animal.

5. The process of any one of claim 1, 2, or 3 wherein the naturally occurring chitin source comprises crustacean shells.

6. The process of any one of claim 1, 2, or 3 wherein the chitin source comprises shrimp shells.

7. The process of any one of claim 1, 2, or 3 wherein the demineralization step (a) is carried out before the deproteination step (b).

8. The process of any one of claim 1, 2, or 3 wherein the chitosan polymer obtained from step (e) is in flake form and is thereafter ground into powder form.

9. The process of any one of claim 1, 2, or 3 further consisting essentially of one more additional process steps for removing one or more of foreign particles, arsenic, mercury, lead and other heavy metals, and microbiological contaminants from at least one of (i) the chitin source introduced into step (a), and (ii) any of the chitin materials resulting from treatment of the chitin source in step (a).

10. The process of any one of claim 1, 2, or 3 excluding any additional process steps which have the effect of whitening the chitosan product.

* * * * *